C. E. WIESELGREEN.
BALL BEARING.
APPLICATION FILED MAY 11, 1915.
1,183,259.
Patented May 16, 1916.
2 SHEETS—SHEET 1.
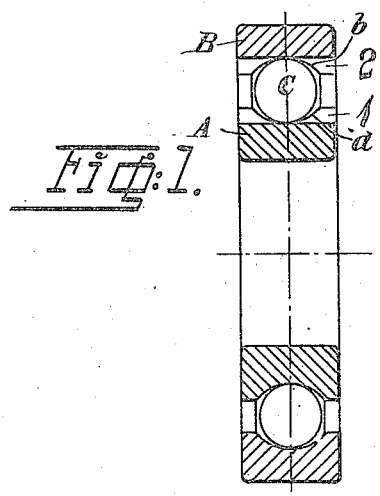
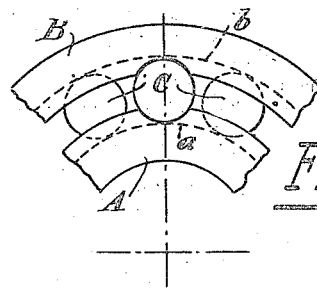
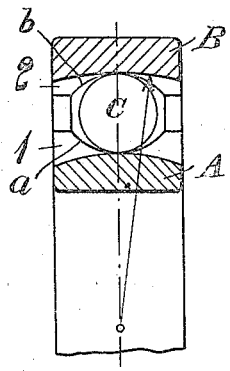
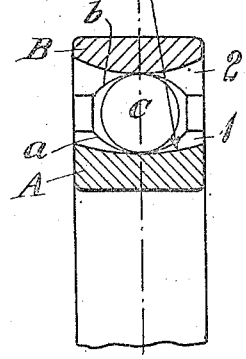
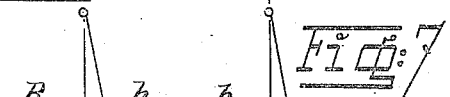
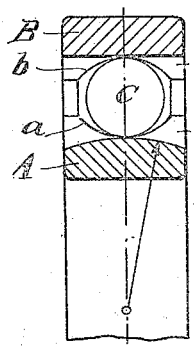
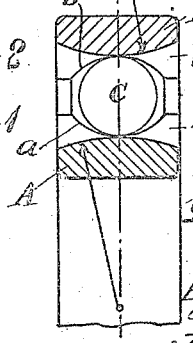
Inventor:
Carl Emil Wieselgreen
By Attys.

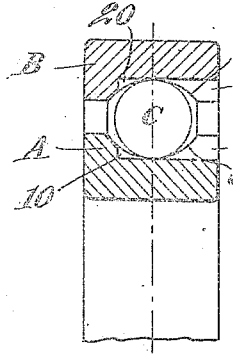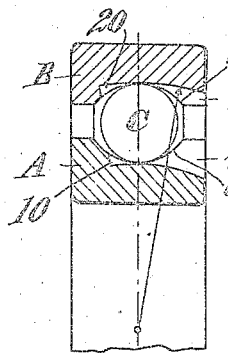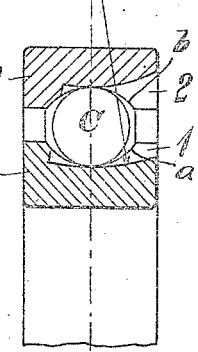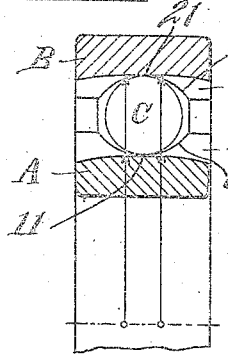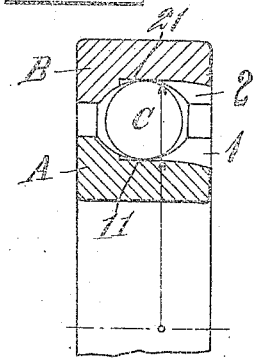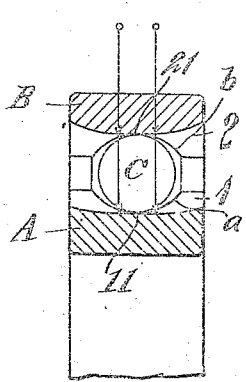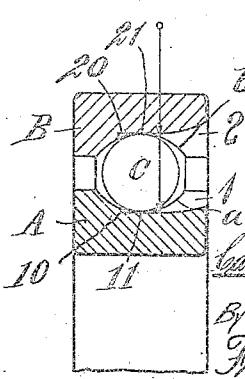

UNITED STATES PATENT OFFICE.

CARL EMIL WIESELGREEN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-BEARING.

1,183,259.

Specification of Letters Patent. Patented May 16, 1916.

Application filed May 11, 1915. Serial No. 27,342.

*To all whom it may concern:*

Be it known that I, CARL EMIL WIESELGREEN, a citizen of the Kingdom of Sweden, residing at Gottenborg, Sweden, have invented new and useful Improvements in Ball-Bearings, of which the following is a specification.

This invention relates to ball bearings of the type having grooved races in both the track rings and transverse recesses or channels extending from the side face of the track rings to the ball tracks and forming an opening, through which the balls may be filled into the bearing. If in ball bearings of this type the balls are to be filled in without compression or deformation of the material of the track rings or the balls, the said filling opening is to be at least of a size corresponding to the great circle of the balls and, besides, so formed, that the recesses extend to the middle of the ball races, that is to the bottoms of the grooves which form the ball-tracks Whether the filling passage is straight and parallel to the axis of the bearing or curved toward or from the said axis, if the side-wall of the grooved ball race is partially cut away at one side only at the point where the filling passage enters the ball race, the balls are not supported at the one side, when passing said point. Since further, the balls, owing to the load, are elastically compressed to a certain extent, the aforesaid facts result in that the forces acting on a ball are unable to keep each other in equilibrium at the filling opening, and owing thereto the ball tends to turn off toward the said opening. This lateral movement will entail the inconvenience, that the ball, on passing the filling opening, will be easily exposed to noxious shocks because of the edges formed at the intersection of the grooved ball race and the filling passage, which both are torus-formed surfaces, said edges extending with decreasing height to the middle of the ball race.

The object of the invention is to prevent such shocks by so arranging the filling passages, that the forces acting on the balls do not give any lateral component at the said passages. According to the invention this result is attained by forming the filling passages of the track-rings symmetrical on both sides of the center plane of the balls, at least at the portion of the passages which, when the bearing is in operation, comes into contact with the balls. By forming the filling passages in this manner the elastic compression of the balls, when passing the filling opening, is released equally at each side of the center plane of the balls, and consequently no lateral component arises tending to move the ball aside at the filling opening. The continuity of the track surface at the bottom of the ball-race groove is maintained in this present improvement.

Several embodiments of the invention are illustrated in the accompanying drawings, in which—

Figure 1 is a sectional view of a ball bearing having straight symmetrical filling passages. Fig. 2 is a partial side view thereof. Figs. 3 to 14 show other constructional forms of the invention.

In the various figures of the drawings the inner ring is designated by the reference character A and the outer ring by B. These rings are provided respectively with grooves $a$, $b$, constituting the raceway for the series of balls C. The face of the wall at the bottom of the groove affords the track upon which the balls roll. The rings A and B are shown provided with side fill passages 1 and 2 respectively, passing transversely from one side of the bearing ring beyond the center plane of the ball series in such manner that the continuity of the track face upon which the balls roll is maintained. The walls of the fill passage on the respective sides of such track in each ring are of similar formation. If the walls of the fill passage on one side of the track are bounded by straight lines transversely of the bearing, the walls of the extension constitute extensions of such straight lines. If such walls of the fill passage are bounded by curved lines, the extension is bounded by extensions of these curved lines. In other words, the fill passage and the extension have symmetrical walls at both sides of the track upon which the balls roll.

Referring to Figs. 1 and 2, the filling passages 1 and 2 are formed as straight (cylindrical) channels parallel to the axis and passing transversely through the bearing, which on account thereof is symmetrical at the filling opening on both sides of the center-plane of the ball-series. Owing thereto the balls, on running, will pass the fill-place without any tendency of turning off toward the one side or the other, and besides, noxious shocks at the filling opening are prevented.

Instead of a straight filling opening filling channels may also be used which, in the longitudinal direction, are curved toward or from the axis, as is shown in Figs. 3 and 4 respectively. In the constructional form shown in Fig. 3 the channel 1 of the inner track-ring is convex and the channel 2 of the outer track-ring concave in the longitudinal direction of the channels, whereas in the constructional form shown in Fig. 4 the arrangement is reversed. In both cases the filling passages are symmetrical in relation to the center-plane of the ball-series. A straight filling channel and a convexly curved filling channel as shown in Figs. 5 and 6, or two convexly curved channels, as is shown in Fig. 7, may also be combined.

To attain the object of the invention it is not necessary, that the filling channels 1 and 2 be extended transversely through the whole width of the track-rings, as is shown in Figs. 1 to 7, since it is sufficient, if the symmetrical shape of the channels is limited to a certain portion at each side of the center-plane of the balls. Filling channels of that shape are shown in Figs. 8, 9 and 10, wherein the filling channels 1 and 2 are shown extending from one side of the bearing rings A and B respectively beyond the center plane of the ball series, the extensions being respectively indicated at 10 and 20. Fig. 8 shows straight filling-channels, Fig. 9 filling channels curved toward the axis and Fig. 10 such channels curved in the direction from the axis. The extension in each of these views is shown presenting walls the faces of which are prolongations of the faces of the walls of the channels.

The filling channels 1 and 2 at the portion situated next the center-plane of the balls may be formed with cylindrical walls, 11 and 21 respectively, and at each side thereof with curved extensions approaching or deflecting from the axis of the bearing. Examples of constructional forms are shown in Figs. 11 to 14.

Having thus described my invention, what I claim as new and desire to secure by Letters Patent is:

1. A bearing comprising two rings, each having a race groove the bottom wall thereof constituting a ball track face and a fill passage on one side communicating with the said race groove and reaching to the said bottom thereof and extending beyond the said track face toward the other side, the walls of the fill passage and of the extension in each ring being symmetrical on the respective sides of the said track face.

2. A bearing comprising two rings, each having a race groove the bottom wall thereof constituting a ball track face and a side fill passage communicating with the said race groove and reaching to the said bottom thereof, the walls of the fill passage at the respective sides of such track in each ring being of similar formation.

In testimony whereof, I have signed my name in presence of two subscribing witnesses.

CARL EMIL WIESELGREEN.

Witnesses:
B. O. EKMAN,
NEB. LINDSKOG.

Copies of this patent may be obtained for five cents each, by addressing the "Commissioner of Patents, Washington, D. C."